United States Patent
Obata et al.

(10) Patent No.: US 12,362,606 B2
(45) Date of Patent: Jul. 15, 2025

(54) CONSTRUCTION MACHINE SYSTEM

(71) Applicant: JDC Corporation, Tokyo (JP)

(72) Inventors: Hiroshi Obata, Tokyo (JP); Masakazu Sekiguchi, Tokyo (JP); Hidetoshi Morimoto, Tokyo (JP); Tsukasa Baba, Tokyo (JP)

(73) Assignee: JDC Corporation, Tokyo (JP)

( * ) Notice: Subject to any disclaimer, the term of this patent is extended or adjusted under 35 U.S.C. 154(b) by 0 days.

(21) Appl. No.: 18/557,725

(22) PCT Filed: Jan. 12, 2022

(86) PCT No.: PCT/JP2022/000727
§ 371 (c)(1),
(2) Date: Oct. 27, 2023

(87) PCT Pub. No.: WO2022/249529
PCT Pub. Date: Dec. 1, 2022

(65) Prior Publication Data
US 2024/0213821 A1 Jun. 27, 2024

Related U.S. Application Data

(60) Provisional application No. 63/194,205, filed on May 28, 2021.

(51) Int. Cl.
*H02J 50/90* (2016.01)
*H02J 50/10* (2016.01)
(Continued)

(52) U.S. Cl.
CPC .............. *H02J 50/90* (2016.02); *H02J 50/10* (2016.02); *H02J 50/40* (2016.02); *B02C 23/00* (2013.01)

(58) Field of Classification Search
CPC . H02J 50/90; H02J 50/10; H02J 50/40; B02C 23/00; E02F 5/00; E02F 7/00; E02F 9/00
See application file for complete search history.

(56) References Cited

U.S. PATENT DOCUMENTS

2012/0086281 A1* 4/2012 Kanno ..................... H01Q 3/26
307/104
2013/0049484 A1* 2/2013 Weissentern ............ H02J 50/90
307/104
(Continued)

FOREIGN PATENT DOCUMENTS

JP 2000-335728 A 12/2000
JP 2003-88744 A 3/2003
(Continued)

*Primary Examiner* — Lincoln D Donovan
*Assistant Examiner* — Alex W Lam
(74) *Attorney, Agent, or Firm* — Young Basile Hanlon & MacFarlane, P.C.

(57) ABSTRACT

A user-friendly construction machine system with shorter installation work time and wiring work time is provided. The construction machine system includes a rotary crusher unit and a feeding conveyor unit. The feeding conveyor unit is different from the rotary crusher unit. The feeding conveyor unit includes a third power reception device that receives power from the rotary crusher unit by a wireless power supply and a second motor that receives the power from the third power reception device via a wire.

15 Claims, 13 Drawing Sheets

(51) Int. Cl.
　　　*H02J 50/40*　　　(2016.01)
　　　*B02C 23/00*　　　(2006.01)

(56) References Cited

U.S. PATENT DOCUMENTS

2017/0191246 A1　　7/2017　Friend et al.
2018/0371723 A1*　12/2018　Nishi .................. G05D 1/0094
2020/0013549 A1*　 1/2020　Samuelsson ............ H01F 38/14

FOREIGN PATENT DOCUMENTS

| JP | 2004-174448 A | 6/2004 |
| JP | 2015-68142 A | 4/2015 |
| JP | 2020-100997 A | 7/2020 |
| JP | 2021-31842 A | 3/2021 |
| WO | 2014/057587 A1 | 4/2014 |
| WO | 2017/131194 A1 | 8/2017 |

* cited by examiner

CONSTRUCTION MACHINE SYSTEM

TECHNICAL FIELD

The present invention relates to a construction machine system.

BACKGROUND

Conventionally, a self-propelled device or a plant-type device has been known as a soil improvement machine (see JP Patent Publication No. JP 2000-335728 A and JP Patent Publication No. JP 2004-174448 A, for example).

In the case of a plant-type device, because the plant-type device includes a plurality of units, it is common to carry the plurality of units to a construction site or the like, install the units in an appropriate positional relationship, and then perform wiring work.

SUMMARY

The wiring work after the installation may involve many wiring materials and dangerous high-place work, which requires time and effort. In addition, not only a soil improvement machine but also other devices installed at a construction site or the like have the same problem when having a plurality of units.

An object of the present invention is to provide a user-friendly construction machine system with shorter installation work time and wiring work time.

A construction machine system according to a first embodiment includes a first unit and a second unit that is a unit different from the first unit. The construction machine system also includes a first power receiver that receives power from the first unit by wireless power supply and a second power receiver that receives the power from the first power receiver via a wire.

It is possible to provide a user-friendly construction machine system with shorter installation work time and wiring work time.

DETAILED DESCRIPTION

Hereinafter, a construction machine system 1 of a first embodiment of the present invention will be described in detail with reference to the accompanying drawings. Note that the present invention is not limited by the embodiments described below.

First Embodiment

Figure 1:
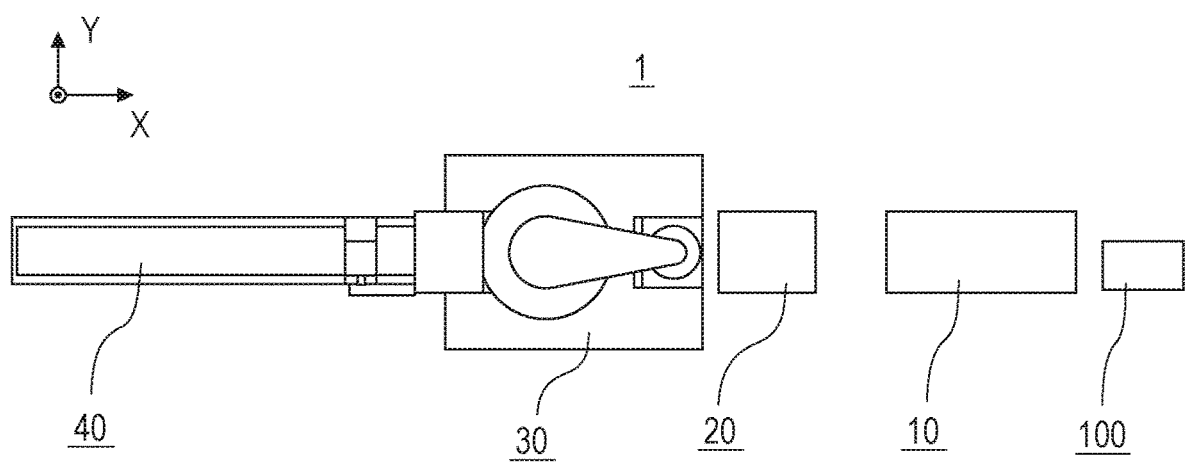
FIG. 1 is a plan view illustrating a construction machine system according to a first embodiment.
Figure 2:
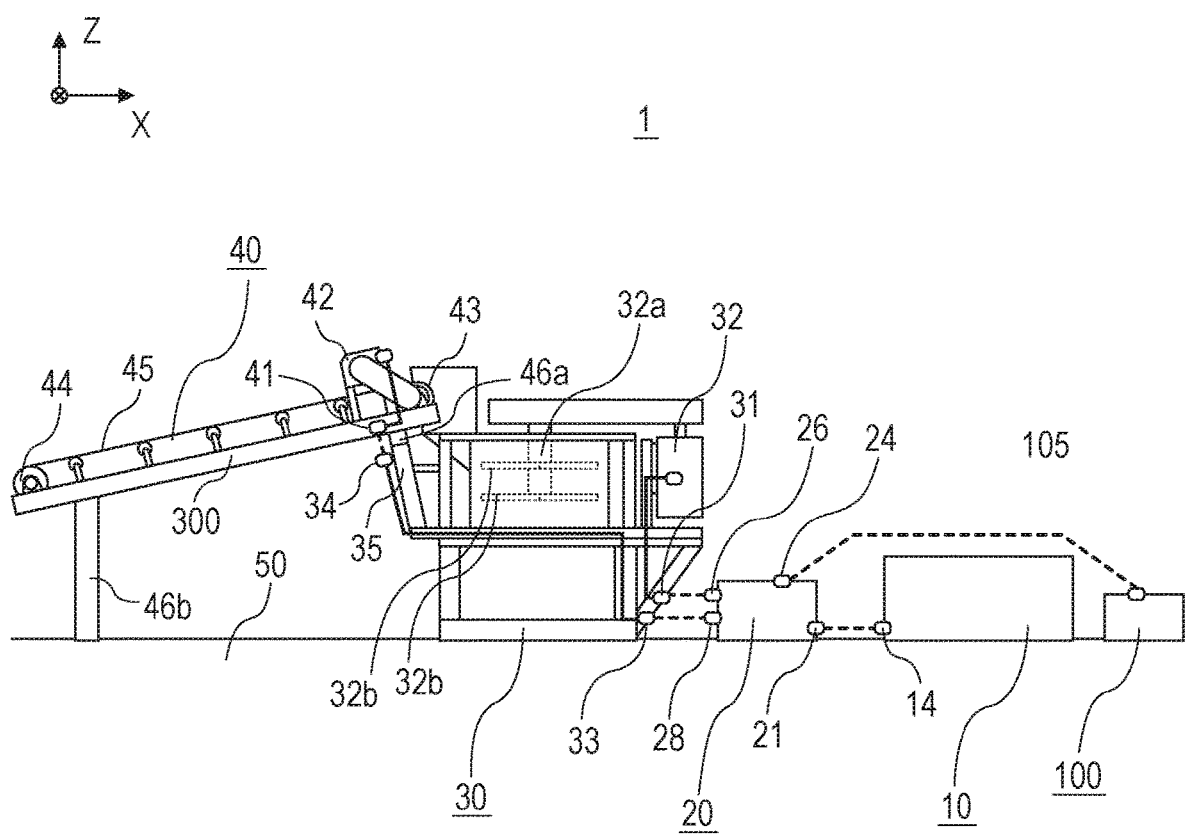
FIG. 2 is a side view illustrating the construction machine system according to the first embodiment.
Figure 3:
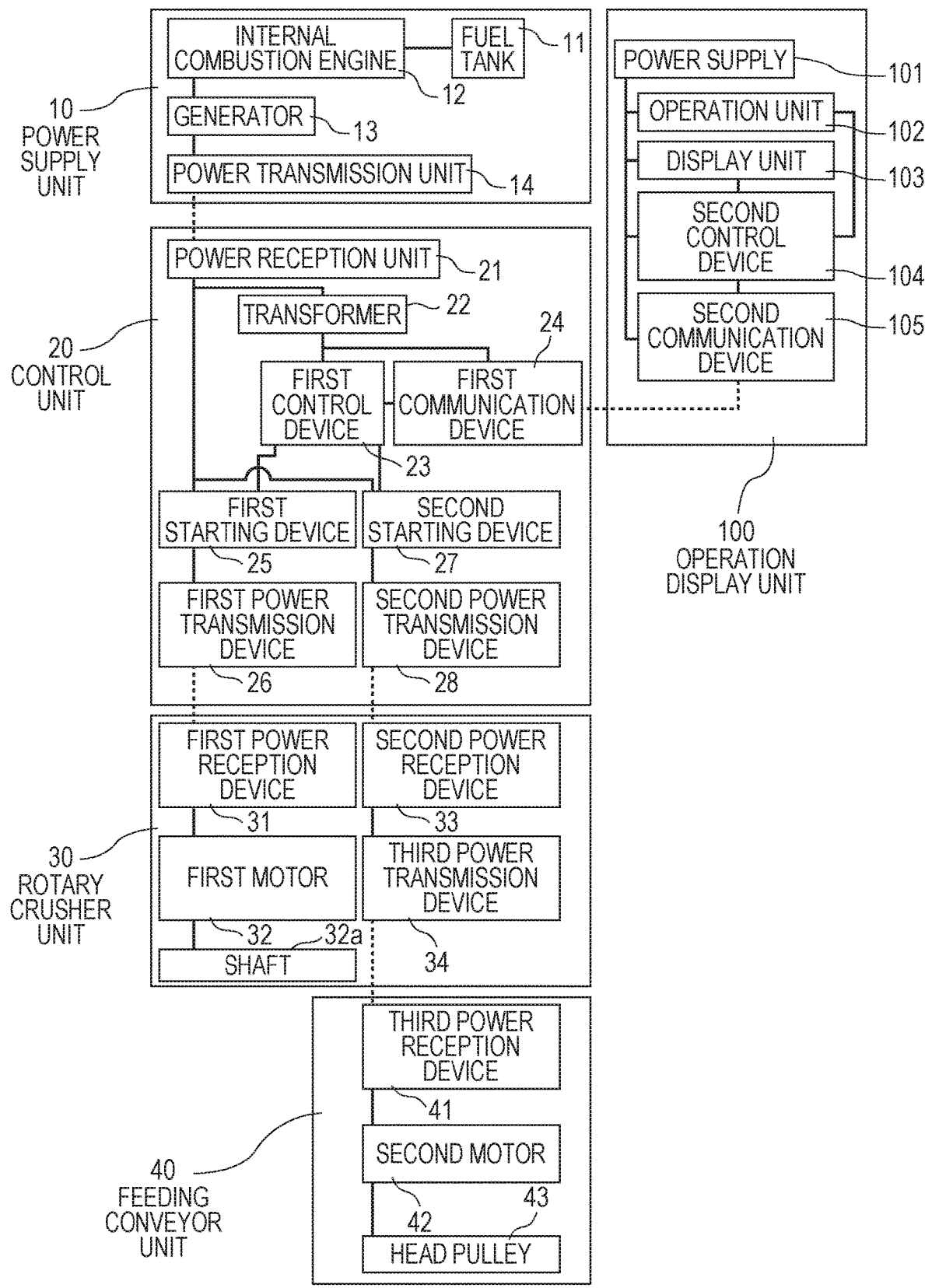
FIG. 3 is a block diagram of a main part of the construction machine system of the first embodiment.

First, a configuration of the construction machine system 1 will be described below with reference to FIGS. 1 to 3. FIG. 1 is a plan view illustrating the construction machine system 1 according to the present embodiment. FIG. 2 is a side view illustrating the construction machine system 1 of the present embodiment. FIG. 3 is a block diagram of a main part of the construction machine system 1 of the present embodiment. For convenience of description, a vertical direction is defined as a Z direction, and two axis directions orthogonal to each other in a horizontal plane are defined as an X direction and a Y direction in FIGS. 1 and 2. In addition, in FIG. 1, in order to simplify the drawing, some components (e.g., first power transmission device 26 described later) are omitted.

The construction machine system 1 of the present embodiment is a device used for improving and effectively using raw material soil such as soil displaced by construction. The construction machine system 1 of the present embodiment includes a power supply unit 10, a control unit 20, a rotary crusher unit 30, a feeding conveyor unit 40, and an operation display unit 100. The construction machine system 1 of the present embodiment is installed on an installation surface 50.

Although details will be described later, the feeding conveyor unit 40 conveys raw material soil toward the rotary crusher unit 30, and the rotary crusher unit 30 crushes the raw material soil. In addition, the control unit 20 mainly controls the rotary crusher unit 30 and the feeding conveyor unit 40 in order to improve raw material soil, and the power supply unit 10 supplies power to the control unit 20. In addition, the operation display unit 100 transmits and receives control signals to and from the control unit 20. The power supply unit 10, the control unit 20, the rotary crusher unit 30, the feeding conveyor unit 40, and the operation display unit 100 may be collectively referred to as five units.

The construction machine system 1 of the present embodiment is assembled in a factory for every five units. The construction machine system 1 is transported from the factory to a construction site in a state of being divided for every five units. Installation and wiring work are performed at the construction site.

In the present embodiment, the dimension and weight of each of the above-described five units are determined to be a dimension and weight that comply with transportation restrictions on ordinary roads. Note that each of the five units are connected by wired connection using an electric wire. On the other hand, power supply and control signal communication between the rotary crusher unit 30 and the feeding conveyor unit 40 are performed wirelessly as described later, so that transmission and reception of power and transmission and reception of control signals are performed.

As a result, wiring between the rotary crusher unit 30 and the feeding conveyor unit 40 can be omitted or reduced at the construction site, and the time for installation and wiring work can be shortened. Note that transmission and reception of power or transmission and reception of control signals may be performed wirelessly at a wired connection part in the above-described five units.

The construction machine system 1 of the present embodiment is installed and wired based on the installation position of the rotary crusher unit 30. This is because the construction machine system 1 is configured with the rotary crusher unit 30 as the center. In the present embodiment, the feeding conveyor unit 40 is installed on the −X direction side of the rotary crusher unit 30. The control unit 20 is installed between the rotary crusher unit 30 and the power supply unit 10. The power supply unit 10 is installed on the +X direction side of the control unit 20. In the present embodiment, the operation display unit 100 includes a mobile tablet and is within a wirelessly communicable range. Note that the arrangement of the units is not limited to the illustrated positions. The arrangement of the units is determined by an arrangement situation of other construction machines (not illustrated) and an arrangement situation of soil displaced by construction. In addition, it is preferable that the installation surface 50 on which the construction machine system 1 of the present embodiment is installed is earth and sand, and a part of the installation surface 50 in contact with the construction machine system 1 is leveled flat at the same height. This is because the construction machine system 1 of the present embodiment is designed to be horizontally installed on a plane having the same height. In addition, it is preferable that the five units constituting the construction machine system 1 of the present embodiment be fixed to the ground or fixed to an iron plate laid on the installation surface 50. This is to prevent the positional relationship among the units from being shifted due to an earthquake or the like.

A method of assembling the five units constituting the construction machine system 1 of the present embodiment will be described later with reference to FIG. 4.

The power supply unit 10 supplies necessary power to a first motor 32 of the rotary crusher unit 30 and a second motor 42 of the feeding conveyor unit 40. The first motor 32 drives a shaft 32a described later of the rotary crusher unit 30. The voltage of the first motor 32 is 200 V, and the output of the first motor 32 is about 100 KW. The second motor 42 drives a head pulley 43 described later of the feeding conveyor unit 40. The voltage of the second motor 42 is 200 V, and the output of the second motor 42 is about 10 kW. Therefore, the first motor 32 has a larger output than the second motor 42.

The power supply unit 10 of the present embodiment is a mobile diesel generator. The power supply unit 10 includes a fuel tank 11, an internal combustion engine 12, a generator 13, and a power transmission unit 14 as illustrated in the block diagram of FIG. 3.

The fuel tank 11 stores light oil and supplies the light oil to the internal combustion engine 12 by a supply mechanism (not illustrated).

The internal combustion engine 12 is a diesel engine in the present embodiment and transmits the generated rotational force to the generator 13 via an output shaft (not illustrated).

The generator 13 rotates a magnet (not illustrated) by the rotational force from the diesel engine and generates power in a fixed coil (not illustrated) by electromagnetic induction. The power generator 13 is connected to the power transmission unit 14 by wired connection and transmits the generated power to the power transmission unit 14.

The power transmission unit 14 is a coil and generates a magnetic field when electricity flows. An induced current flows when the power reception unit 21 described later receives the magnetic field, and electricity is generated in the power reception unit 21. As described above, in the present embodiment, wireless power supply is achieved by the electromagnetic induction system. In the present embodiment, wireless power supply is used when the distance between the power transmission unit 14 and the power reception unit 21 is 1 meter (m) or less, and wired connection is used when the distance exceeds 1 m. Note that the wired connection may be connection by wire or connection by a connector.

The configuration of the power supply unit 10 is not limited to the above-described configuration, and a solar power generation system, a perovskite-type solar power generation system, a wind power generation system, a hydrogen fuel cell, a lead-acid battery, a lithium ion battery, an all-solid-state battery, an all-resin battery, a generator using an ammonia mixed combustion engine, a generator using an ammonia dedicated combustion engine, space solar power generation, or a commercial power supply may be used. When renewable energy is used, carbon dioxide (greenhouse gas) emissions of the construction machine system 1 can be reduced.

As illustrated in the block diagram of FIG. 3, the control unit 20 includes a power reception unit 21, a transformer 22, a first control device 23, a first communication device 24, a first starting device 25, a first power transmission device 26, a second starting device 27, and a second power transmission device 28.

The power reception unit 21 is a coil and receives power from the power transmission unit 14 by wireless power supply.

The transformer 22 is connected to the power reception unit 21 by wired connection and transforms the power received by the power reception unit 21 from 200 volts (V) to 100 V. The transformer 22 transmits the transformed power to the first control device 23 and the first communication device 24 connected by wired connection. Note that in the present embodiment, the voltages of the first control device 23 and the first communication device 24 are the same, but the voltages may be different. When the voltages are different (e.g., 24 V), a transformer (not illustrated) may be provided.

In the present embodiment, the voltage related to the first motor 32 of the rotary crusher unit 30 and the second motor 42 of the feeding conveyor unit 40 is 200 V, and the voltage related to the first control device 23 and the first communication device 24 is 100 V.

In the present embodiment, the voltage is changed using the transformer 22 provided in the control unit 20, but a plurality of power supplies that generates necessary voltages may be used. In addition, each of the five units may include a power supply.

The first control device 23 controls the rotary crusher unit 30 and the feeding conveyor unit 40.

As control of the rotary crusher unit 30, the first control device 23 controls the supply and stop (hereinafter referred to as interruption) of power supply from the first starting device 25 to the first power transmission device 26. Thus, because the drive and stop of the first motor 32 are controlled, the rotation and stop of the shaft 32a are controlled. In the present embodiment, the first control device 23 is connected to the first starting device 25 by wired connection.

As control of the feeding conveyor unit 40, the first control device 23 controls supply and interruption of power from the second starting device 27 to the second power transmission device 28. Thus, because the drive and stop of the second motor 42 are controlled, the rotation and stop of the head pulley 43 are controlled. In the present embodiment, the second starting device 27 is connected by wired connection.

When the load current of the first motor 32 is equal to or higher than the rated current (e.g., when raw material soil includes hard rock), the first control device 23 performs control to gradually reduce the rotation speed of the first motor 32. In addition, in an emergency state such as when abnormal noise occurs from a bearing (not illustrated) that holds the shaft 32a of the rotary crusher unit 30 described later, the first control device 23 performs control to stop the first motor 32. In addition, when the load current of the second motor 42 becomes equal to or higher than the rated current (e.g., when an amount of raw material soil to be conveyed is large), the first control device 23 performs control to gradually reduce the rotation speed of the second motor 42. In addition, in an emergency state such as when abnormal noise occurs from a bearing (not illustrated) that holds the head pulley 43 of the feeding conveyor unit 40 described later, the first control device 23 performs control to stop the second motor 42.

The first communication device 24 communicates a control signal with a second communication device 105 of the operation display unit 100 described later. The communication may be wireless communication or wired communication.

The first starting device 25 is an inverter, for example, is connected to the first power transmission device 26 by wired connection. The first starting device 25 supplies and interrupts power to the first power transmission device 26 according to a control signal from the first control device 23.

The first power transmission device 26 is similar to the coil described above and transmits power from the first starting device 25 to a first power reception device 31 described later by wireless power supply. A wireless power supply is used when the separation distance between the first power transmission device 26 and the first power reception device 31 is 1 m or less, and a wired connection is used when the separation distance exceeds 1 m, more generally exceeds a predetermined distance where 1 m is an example thereof. Note that the wired connection may be connection by wire or connection by a connector. The length of the wire can be longer than a distance between units.

The second starting device 27 is an inverter, for example, is connected to the second power transmission device 28 by wired connection, and supplies and interrupts power to the second power transmission device 28 according to a control signal from the first control device 23.

The second power transmission device 28 is a coil and transmits power from the second starting device 27 to a second power reception device 33 of the rotary crusher unit 30 described later by a wireless power supply. A wireless power supply is used when the separation distance between the second power transmission device 28 and the second power reception device 33 is 1 m or less, and a wired connection is used when the separation distance exceeds 1 m. Note that the wired connection may be connection by wire or connection by a connector.

The rotary crusher unit 30 is a device that improves raw material soil conveyed by the feeding conveyor unit 40 to a required quality.

The rotary crusher unit 30 includes the first power reception device 31, the first motor 32, the shaft 32a, an impact member 32b, the second power reception device 33, a third power transmission device 34, and a connection pole 35.

The first power reception device 31 is a coil and receives power from the first power transmission device 26 of the control unit 20 by wireless power supply.

The first motor 32 is connected to the first power reception device 31 by wired connection and rotates the shaft 32a of the rotary crusher unit 30 via a belt (not illustrated) using the power received by the first power reception device 31.

In the present embodiment, a plurality of rod-shaped impact members 32b extending in a direction orthogonal to the Z axis is attached to the shaft 32a.

The impact member 32b rotates about the Z axis by the rotation of the shaft 32a and crushes the raw material soil conveyed by the feeding conveyor unit 40 to improve the raw material soil.

As described above, as control of the rotary crusher unit 30, the first control device 23 controls the supply and stop (also referred to as interruption) of power from the first starting device 25 to the first power transmission device 26. As described above, the first control device 23 controls the rotation and stop of the shaft 32a by controlling the drive and stop of the first motor 32.

The second power reception device 33 is a coil and receives power from the second power transmission device 28 of the control unit 20 by wireless power supply.

The third power transmission device 34 is a coil and is connected to the second power reception device 33 by a wired connection. The third power transmission device 34 transmits power received by the second power reception device 33 to a third power reception device 41 of the feeding conveyor unit 40 described later by a wireless power supply. A wireless power supply is used when the distance between the third power transmission device 34 and the third power reception device 41 is 1 m or less, and a wired connection is used when the distance exceeds 1 m. Note that the wired connection may be connection by wire or connection by a connector.

The connection pole 35 has a columnar shape extending in the +Z-axis direction and the −X-axis direction, is provided on the −X side of the rotary crusher unit 30, and is joined to a front leg 46a of the feeding conveyor unit 40 described later via a bolt. A plurality of connection poles 35 having the same shape may be provided at positions spaced apart in parallel in the Y-axis direction.

The feeding conveyor unit 40 is a device that conveys raw material soil supplied by a backhoe (not illustrated) or raw material soil supplied by a soil feeder (not illustrated) to the rotary crusher unit 30.

The feeding conveyor unit 40 includes a conveyor main body 300, the third power reception device 41, the second motor 42, the head pulley 43, a tail pulley 44, a belt 45, the front leg 46a, and a rear leg 46b.

The conveyor main body 300 is a frame to which components of the feeding conveyor unit 40 are attached.

The third power reception device 41 is a coil and receives power from the third power transmission device 34 of the rotary crusher unit 30 by wireless power supply.

The second motor 42 is connected to the third power reception device 41 by a wired connection and rotates the head pulley 43 via a drive chain (not illustrated) using the power received by the third power reception device 41. That is, in the present embodiment, the rotary crusher unit 30 corresponds to a first unit, the third power reception device 41 corresponds to a first power receiver, the second motor 42 corresponds to a second power receiver, and the feeding conveyor unit 40 corresponds to a second unit.

The head pulley 43 has a cylindrical shape, is paired with the tail pulley 44 also having a cylindrical shape, and is wound with the seamless belt 45.

When the head pulley 43 rotates, the belt 45 conveys the raw material soil supplied by the backhoe (not illustrated) or the raw material soil supplied by the soil feeder (not illustrated) to the rotary crusher unit 30.

As described above, as control of the feeding conveyor unit 40, the first control device 23 controls supply and interruption of power from the second starting device 27 to the second power transmission device 28. As described above, the first control device 23 controls the drive and stop of the second motor 42, and thereby controls rotation and stop of the head pulley 43.

The front leg 46a is joined to the connection pole 35 of the rotary crusher unit 30 described above via a bolt. A plurality of front legs 46a having the same shape may be provided at positions spaced apart in parallel in the Y-axis direction in pairs with the connection poles 35.

The rear leg 46b has a columnar shape extending in the −Z axis direction, is provided on the −X axis direction side of the feeding conveyor unit 40, and is in contact with the installation surface 50.

The operation display unit 100 is used by an operator of the construction machine system 1 of the present embodiment to perform a driving operation.

The operation display unit 100 communicates a control signal between the second communication device 105 described later and the first communication device 24 of the control unit 20. The communication may be wired or wireless communication.

The operation display unit 100 is a portable tablet and can be used in a remote location (not illustrated) within a range of a wireless standard. The wireless standard may be Wi-Fi® or Bluetooth®.

The operation display unit 100 includes a power supply 101, an operation unit 102, a display unit 103, a second control device 104, and the second communication device 105.

The power supply 101 is a battery in the present embodiment, is connected to the operation unit 102, the display unit 103, the second control device 104, and the second communication device 105 by a wired connection, and transmits power.

The operation unit 102 is connected to the second control device 104 by a wired connection and generates an input signal. The operation unit 102 of the present embodiment is a touch panel, but the operation unit 102 may be a button or a knob.

The display unit 103 is connected to the second control device 104 by a wired connection and displays, for example, the operation state of the first motor 32. The display unit 103 of the present embodiment is a touch panel, but the display unit 103 may be a liquid crystal monitor.

The second control device 104 is connected to the second communication device 105 by a wired connection and controls an input signal (i.e., a control signal) generated from the operation unit 102.

The second communication device 105 communicates a control signal with the first communication device 24 of the control unit 20. The communication may be wireless communication or wired communication.

The configuration of the operation display unit 100 of the present embodiment is not limited to the illustrated configuration. In addition, the operation display unit 100 of the present embodiment is a mobile tablet, but the operation display unit 100 may be a fixed tablet or may be installed and used in an operation room (not illustrated).

Description of Installation and Wiring

Figure 4:
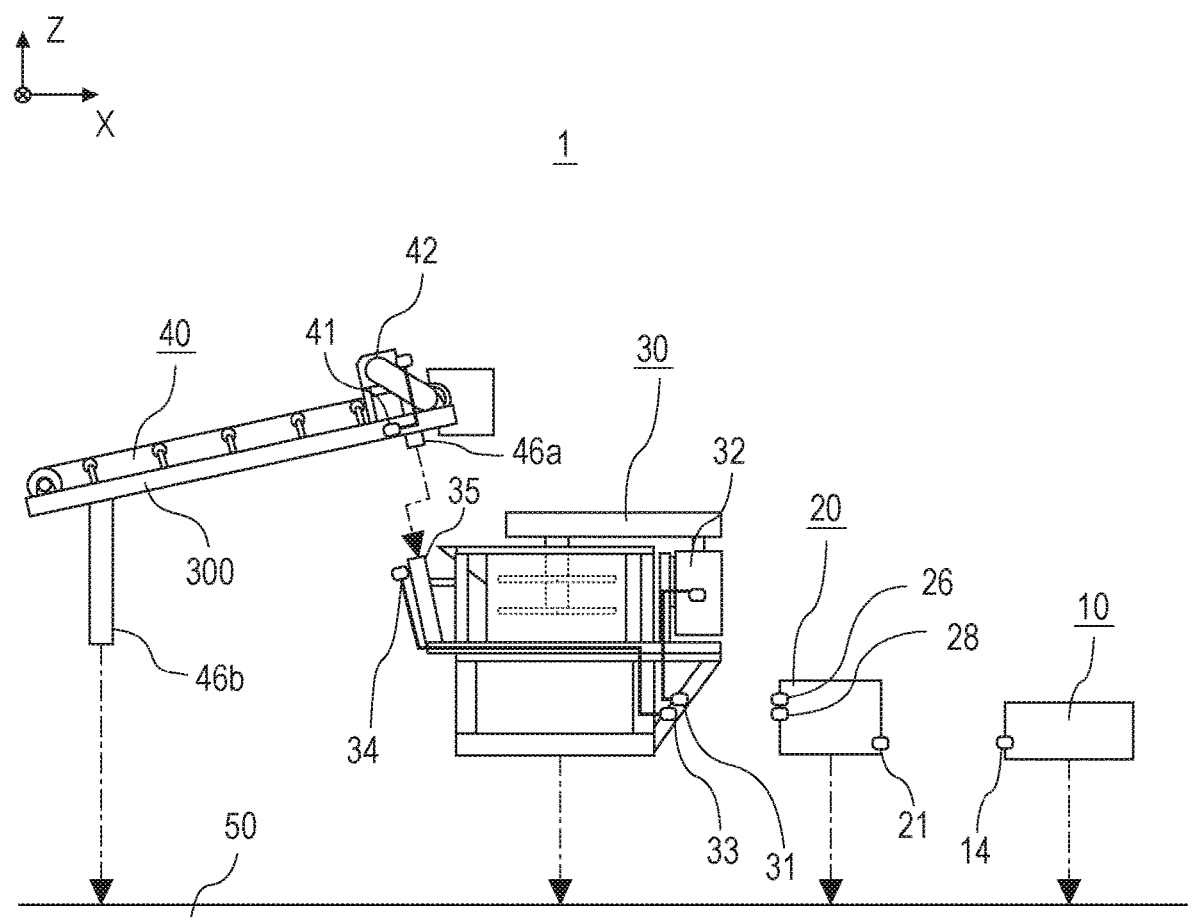
FIG. 4 is an enlarged side view illustrating a part of the construction machine system of the first embodiment.
Figure 5:
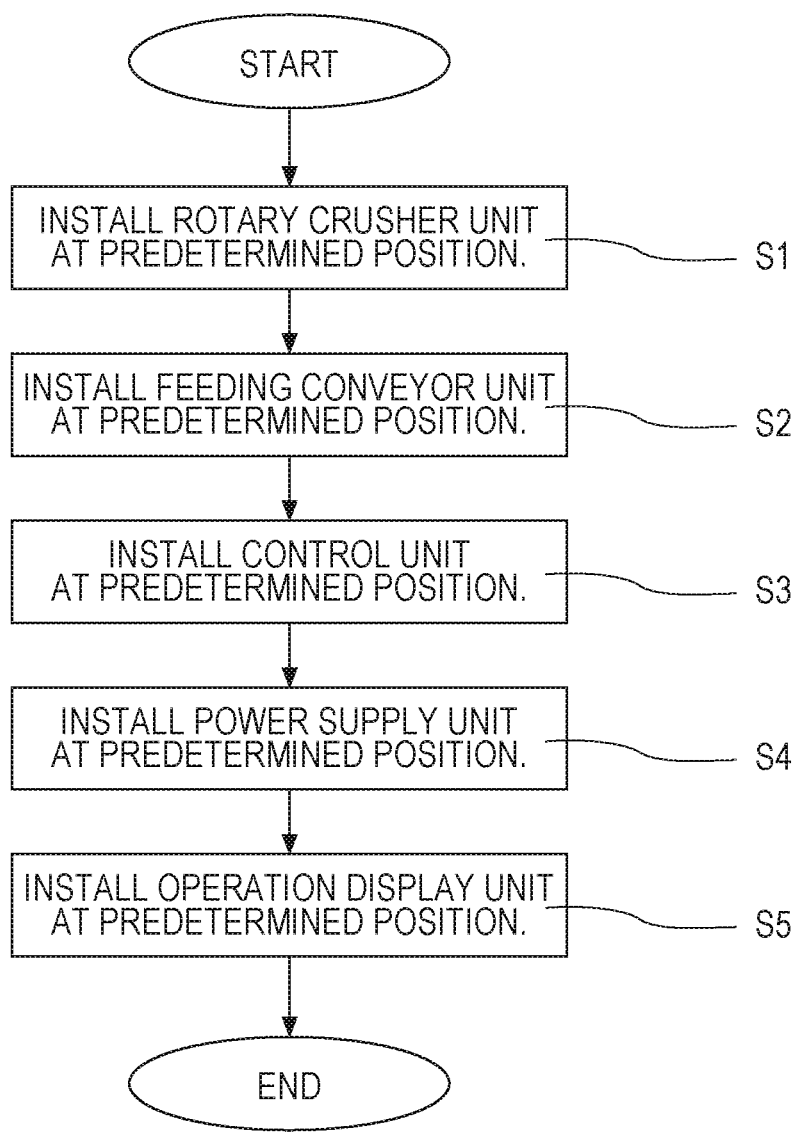
FIG. 5 is an installation flowchart of the construction machine system of the first embodiment.

FIG. 4 is a diagram for describing a method of installing and wiring the construction machine system 1 of the present embodiment. FIG. 4 enlarges a joint part between the connection pole 35 and the front leg 46a in FIG. 2. FIG. 5 is an installation flowchart of the construction machine system 1. For convenience of description, a vertical direction is defined as a Z direction, and two axis directions orthogonal to each other in a horizontal plane are defined as an X direction and a Y direction in FIG. 4. Hereinafter, the procedure of installation and wiring will be described with reference to FIGS. 4 and 5. Note that in the present embodiment, assembly is performed by a crane (not illustrated) and an operator, but fully automatic assembly without an operator may be used.

Before the construction machine system 1 of the present embodiment is installed, the installation place (e.g., a construction site) of the construction machine system 1 is finished to be flat using a construction machine such as a backhoe such that the difference between the height in the +Z direction and the height in the −Z direction of the place where the installation surface 50 is in contact with the construction machine system 1 is approximately 5 centimeters (cm) or less. This is because if the difference between the height in the +Z direction and the height in the −Z direction is empirically within approximately 5 cm, five units constituting the construction machine system 1 can be horizontally installed on the same plane by sandwiching a thin plate or the like between the construction machine system 1 and the installation surface 50. In addition, an iron plate may be laid between the installation surface 50 and the construction machine system 1 in order to fix each unit so as not to be displaced due to an earthquake or the like.

The rotary crusher unit 30 is lifted by a crane (not illustrated) and installed at a predetermined position on the installation surface 50 (step S1).

The feeding conveyor unit 40 is lifted by a crane (not illustrated), the front leg 46a of the feeding conveyor unit 40 is connected to the connection pole 35 of the rotary crusher unit 30, and the rear leg 46b of the feeding conveyor unit 40 abuts on the installation surface 50 (step S2). The connection pole 35 and the front leg 46a are fastened by bolts, and the positional relationship between the rotary crusher unit 30 and the feeding conveyor unit 40 is uniquely determined. Therefore, by providing the third power transmission device 34 in the vicinity of the front leg 46a of the feeding conveyor unit 40 and providing the third power reception device 41 in the vicinity of the connection pole 35 of the rotary crusher unit 30, the positional relationship between the third power transmission device 34 and the third power reception device 41 is also uniquely determined. Furthermore, because the third power transmission device 34 and the third power reception device 41 are connected by a wireless power supply, wiring work becomes unnecessary at a construction site, and the work time can be shortened.

The control unit 20 is lifted by a crane (not illustrated) and installed at a predetermined position close to the rotary crusher unit 30 on the +X direction side (step S3). Note that the installation position of the control unit is not limited to the position of the present example.

The above-described predetermined close position is a position where the separation distance between the first power transmission device 26 and the first power reception device 31 is within 1 m, and is a position where the separation distance between the second power transmission device 28 and the second power reception device 33 is within 1 m.

The power supply unit 10 is lifted by a crane (not illustrated) and installed at a predetermined position close to the control unit 20 on the +X direction side (step S4). Note that the installation position of the power supply unit 10 is not limited to the position of the present example.

The above-described predetermined close position refers to a position where the separation distance between the power reception unit 21 and the power transmission unit 14 is within 1 m.

As described above, in the present embodiment, the inside of the unit is wired before being carried into the construction site, and power is supplied wirelessly to a place where the separation distance between units is within 1 m. Note that in a case where the separation distance is 1 m or more, power attenuation increases, and thus wired connection is adopted. The separation distance does not necessarily have to be 1 m.

In the construction machine system 1 of the present embodiment, after installation of all the units is completed, each unit is fixed to the ground or an iron plate so as not to be displaced due to an earthquake or the like.

The wireless connection part of the construction machine system 1 of the present embodiment is covered for protection so that a person or a small animal does not easily touch the wireless connection part.

In the present embodiment, the operation display unit 100 is a mobile tablet and only needs to be in a wirelessly communicable range (step S5). In addition, the operation display unit 100 may be a fixed type connected by a wired connection and, in this case, may be installed in an indoor space or outdoors (not illustrated).

As described above, according to the present embodiment, in the construction machine system 1, the electrical wire of each of the five units is connected by wired connection, and on the other hand, power supply and communication between the rotary crusher unit 30 and the feeding conveyor unit 40 are performed wirelessly to perform transmission and reception of power and transmission and reception of control signals. As a result, wiring between the rotary crusher unit 30 and the feeding conveyor unit 40 can be omitted or reduced at the construction site, and a safe and user-friendly construction machine system with shorter installation and wiring work time can be implemented.

In addition, in the present embodiment, when the load current of the first motor 32 is equal to or higher than the rated current (e.g., when raw material soil includes hard rock), the first control device 23 performs control to gradually reduce the rotation speed of the first motor 32. In addition, in an emergency state such as when abnormal noise occurs from a bearing (not illustrated) that holds the shaft 32a of the rotary crusher unit 30, the first control device 23 performs control to stop the first motor 32. In addition, when the load current of the second motor 42 becomes equal to or higher than the rated current (e.g., when an amount of raw material soil to be conveyed is large), the first control device 23 performs control to gradually reduce the rotation speed of the second motor 42. In addition, in an emergency state such as when abnormal noise occurs from a bearing (not illustrated) that holds the head pulley 43 of the feeding conveyor unit 40, the first control device 23 performs control to stop the second motor 42.

In addition, in the present embodiment, when a person sandwiches a plate or the like in a section connected by a wireless power supply between the power supply unit 10 and the control unit 20, the power supply to the first motor 32 and the second motor 42 is stopped, and the operations of the first motor 32 and the second motor 42 can be simultaneously stopped.

Additionally, when a person sandwiches a plate or the like in a section connected by a wireless power supply between the first power transmission device 26 and the first power reception device 31, the power supply to the first motor 32 is stopped, and the first motor 32 is stopped. Alternatively, when a person sandwiches a plate or the like in a section connected by a wireless power supply between the second power transmission device 28 and the second power reception device 33, the power supply to the second motor 42 is stopped, and the second motor 42 is stopped. As described above, in the present embodiment, a person can stop at least one of the first motor 32 or the second motor 42 (i.e., the first motor 32, the second motor 42, or both) in an emergency state such as when raw material soil is spilled from the belt 45 of the feeding conveyor unit 40 or when abnormal noise occurs from a bearing (not illustrated). The plate is an example of a blocking member that cuts off the wireless power supply.

Second Embodiment

As will be described later, the present embodiment includes a drone 200 that is an unmanned flying object. The drone 200 is an example of a flyable moving body that can be used with the teachings herein. The drone 200 monitors the operation status of the five units and sends information to a first control device 23, and the drone 200 performs a stop operation of a first motor 32 and a second motor 42. Therefore, the present embodiment is a construction machine system in which the first control device 23 and the drone 200 perform cooperative control.

As an example of cooperative control, there is a case where a control device (not illustrated) of the drone 200 captures the amount of earth and sand discharged from a rotary crusher unit 30 with an imaging device such as a camera, determines that the amount of earth and sand is larger (or smaller) than usual by image recognition (i.e., using the image obtained by the imaging device), and sends an abnormality signal to the first control device 23 in a case of abnormality. As another example, there is a case where the drone 200 determines that there is an abnormality and sends an abnormality signal to the first control device 23 when a person enters. As still another example, the drone 200 determines that there is an abnormality and sends an abnormality signal to the first control device 23 when earth and sand are spilled from a feeding conveyor unit 40 or the rotary crusher unit 30, for example. The first control device 23 may stop the first motor 32 and the second motor 42 in response to an abnormality signal from the control device (not illustrated) of the drone 200. In this manner, the first control device 23 and the drone 200 cooperate with each other to control an entire construction machine system 1.

Hereinafter, a second embodiment will be described with reference to FIGS. 6 to 10. Note that the same configurations as those of the first embodiment are denoted by the same reference numerals, and the description thereof will be omitted or simplified.

Figure 6:
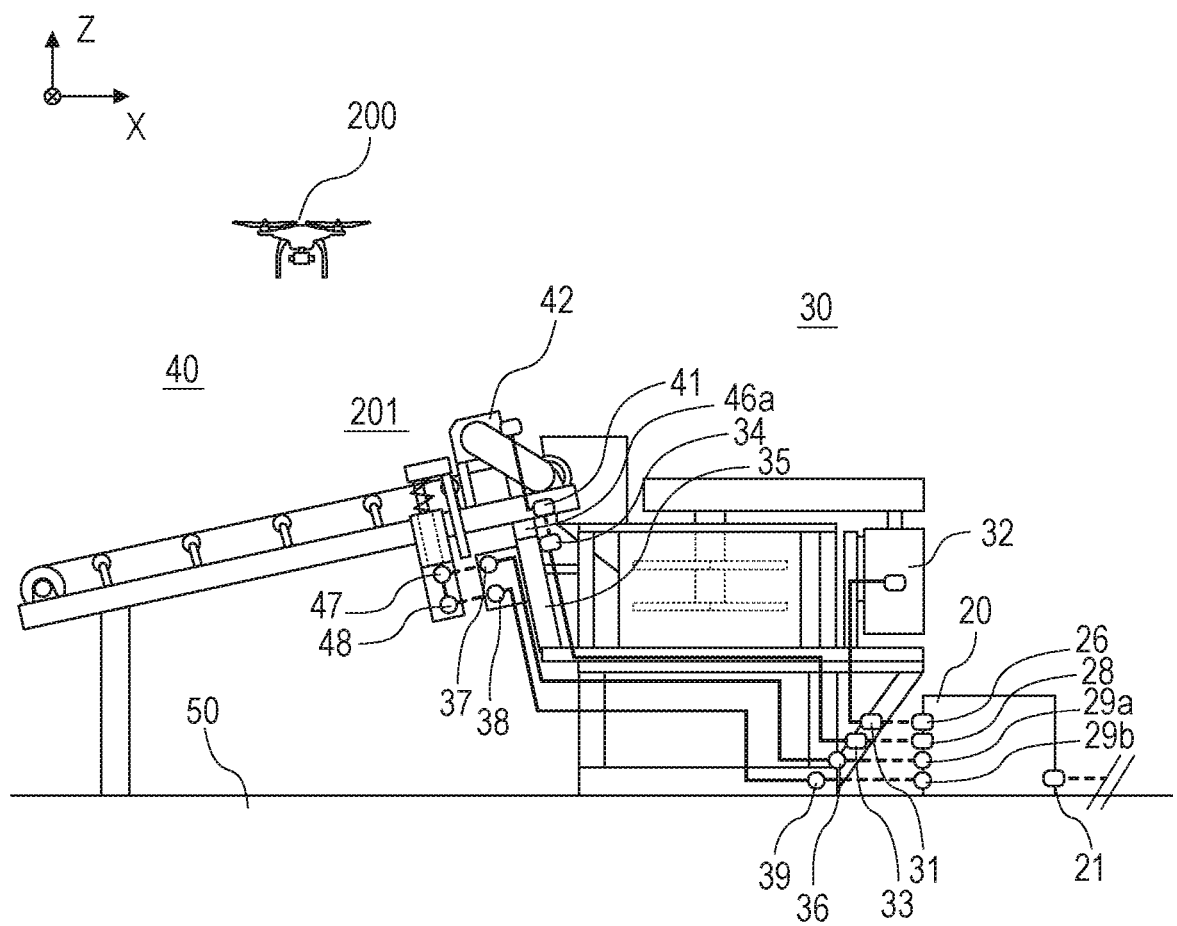
FIG. 6 is a side view illustrating a main part of a construction machine system according to a second embodiment.
Figure 7:
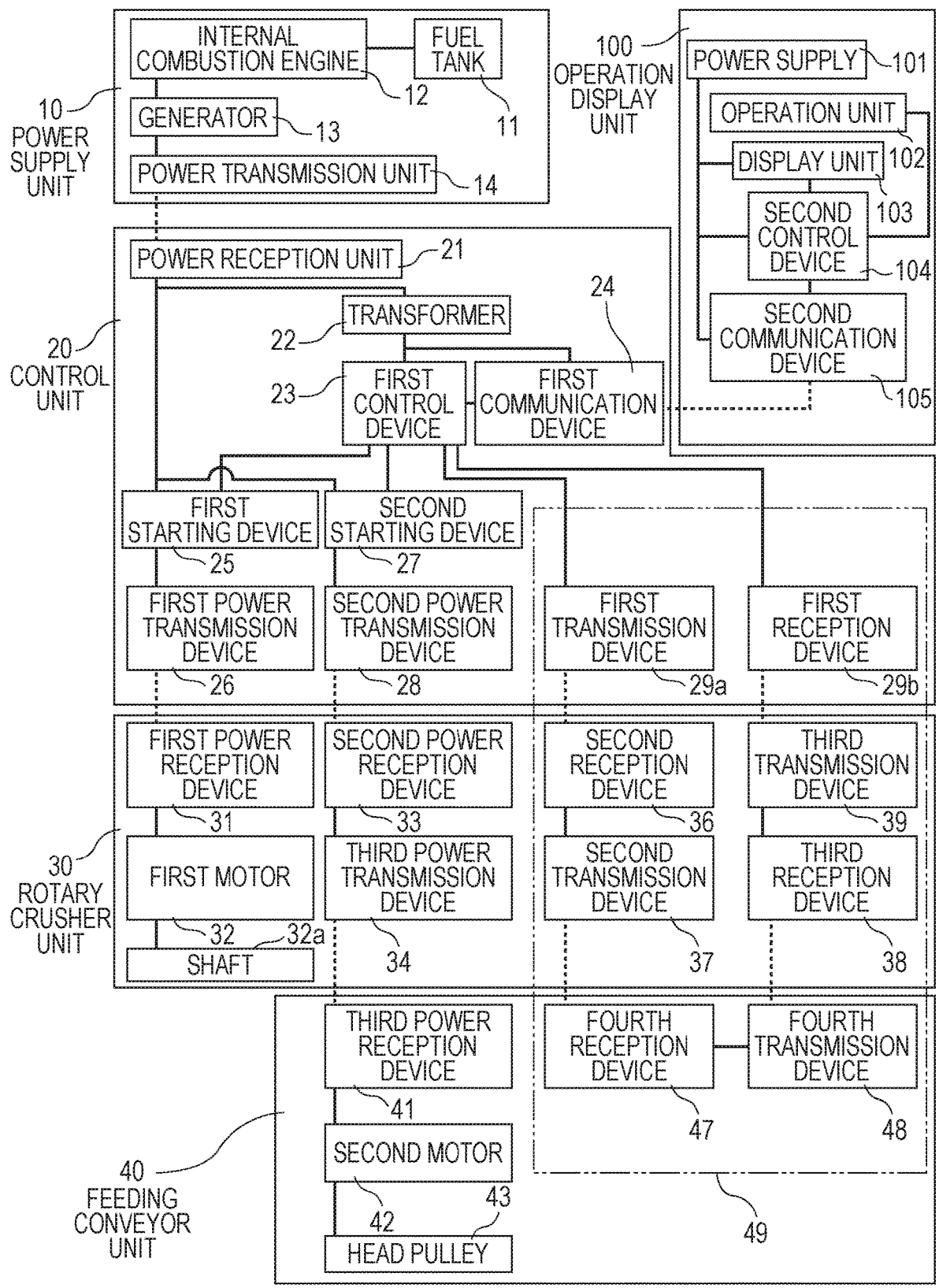
FIG. 7 is a block diagram of a main part of the construction machine system of the second embodiment.
Figure 8:
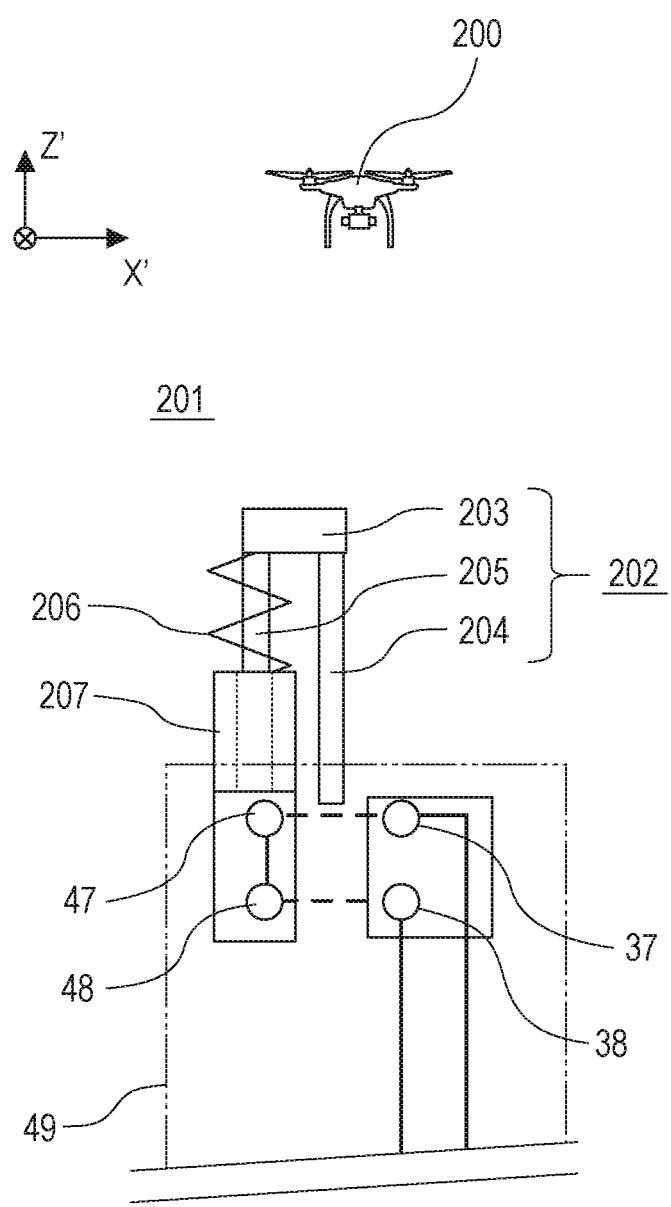
FIG. 8 is a schematic diagram illustrating a state in which an emergency stop circuit of the construction machine system of the second embodiment is energized.
Figure 9:
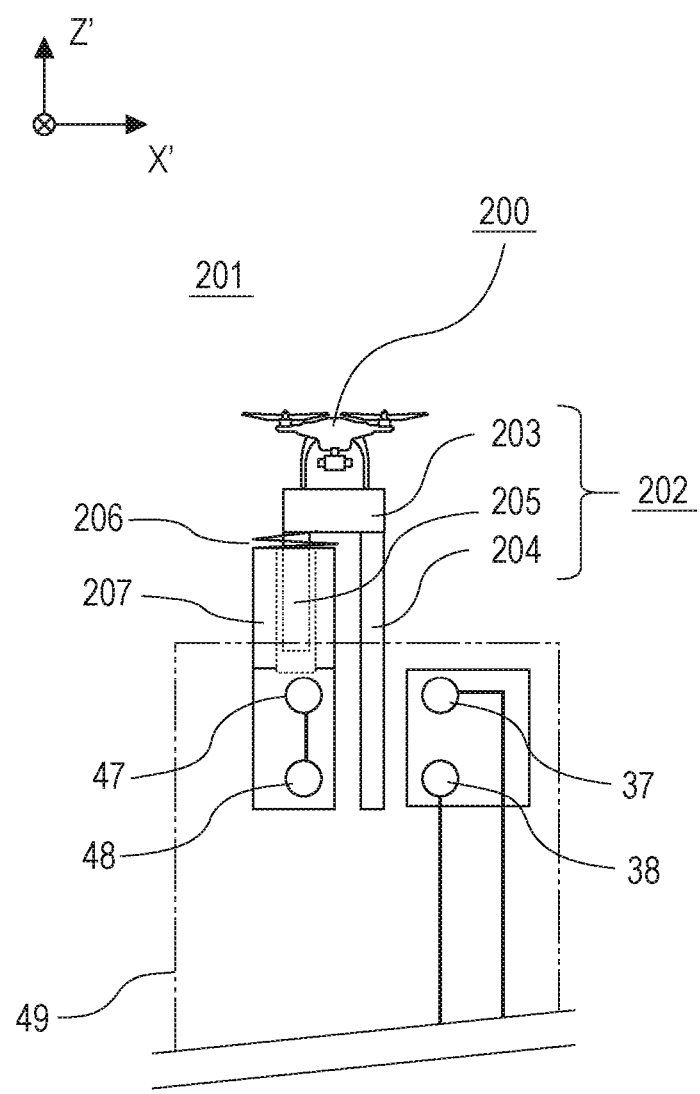
FIG. 9 is a schematic diagram illustrating a state in which the emergency stop circuit of the construction machine system of the second embodiment is interrupted.
Figure 10:
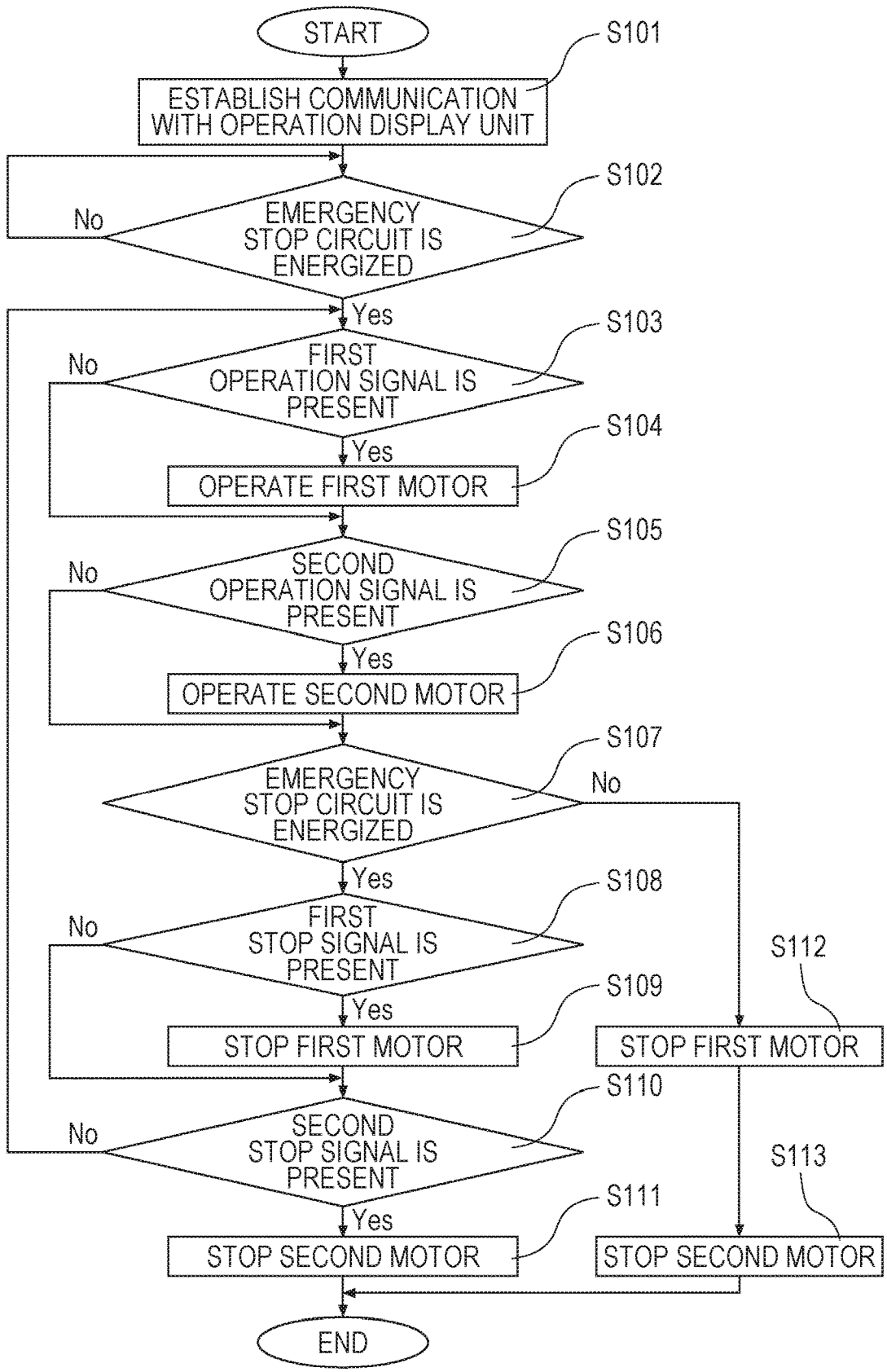
FIG. 10 is a flowchart illustrating the operation of the construction machine system of the second embodiment from start to stop.

FIG. 6 is a side view illustrating a main part of the construction machine system 1 of the present embodiment. FIG. 7 is a block diagram of a main part of the construction machine system 1 of the present embodiment. FIGS. 8 and 9 are side views enlarging the vicinity of an emergency stop device 201 described later. For convenience of description, a longitudinal direction (direction extending in +X direction and +Y direction) of a conveyor main body 300 of the feeding conveyor unit 40 described above is defined as an X' direction. Further, two axial directions orthogonal to the X' direction are defined as a Y' direction and a Z' direction. FIG. 8 is a schematic diagram illustrating a state in which an emergency stop circuit 49 described later is energized, and FIG. 9 is a schematic diagram illustrating a state in which the emergency stop circuit 49 described later is interrupted. FIG. 10 is a flowchart illustrating the operation of the construction machine system 1 of the present embodiment from start to stop.

As illustrated in FIGS. 6 and 7, the construction machine system 1 of the present embodiment includes the drone 200, a control unit 20 that includes a first transmission device 29a and a first reception device 29b, the rotary crusher unit 30 that includes a second reception device 36, a second transmission device 37, a third reception device 38, and a third transmission device 39, and the feeding conveyor unit 40 that includes the emergency stop device 201, a fourth reception device 47, and a fourth transmission device 48. In addition, as described later, the first control device 23, the first transmission device 29a, the second reception device 36, the second transmission device 37, the fourth reception device 47, the fourth transmission device 48, the third reception device 38, the third transmission device 39, and the first reception device 29b are connected in series to form the emergency stop circuit 49 surrounded by a two-dot chain line in FIG. 7.

An operation unit 102 of an operation display unit 100 of the construction machine system 1 of the present embodiment includes a plurality of buttons (not illustrated). For example, the operation unit 102 includes a first operation button for operating a first motor 32, a first stop button for stopping the first motor 32, a second operation button for operating a second motor 42, and a second stop button for stopping the second motor 42. In addition, a first operation signal is generated when the first operation button is pressed, a first stop signal is generated when the first stop button is pressed, a second operation signal is generated when the second operation button is pressed, and a second stop signal is generated when the second stop button is pressed.

The control device (not illustrated) of the drone 200 is for monitoring the situation of the construction machine system 1 of the present embodiment. The control device transfers an image captured by a mounted camera to a monitor (not illustrated) or the like or transmits an abnormality signal to the first control device 23 at the time of abnormality. In order to stop the first motor 32 and the second motor 42, the drone 200 operates the emergency stop device 201 described later. That is, the drone 200 corresponds to a mobile body.

The first transmission device 29a is a coil and is connected to the first control device 23 by a wired connection. The first transmission device 29a transmits a control signal from the first control device 23 to the second reception device 36 of the rotary crusher unit 30 using a wireless power supply.

The second reception device 36 is a coil and receives a control signal from the first transmission device 29a using a wireless power supply.

The second transmission device 37 is a coil and is connected to the second reception device 36 by a wired connection. The second transmission device 37 transmits a control signal from the second reception device 36 to the fourth reception device 47 of the feeding conveyor unit 40 using a wireless power supply.

The fourth reception device 47 is a coil and receives a control signal from the second transmission device 37 using a wireless power supply.

The fourth transmission device 48 is a coil and is connected to the fourth reception device 47 by a wired connection. The fourth transmission device 48 transmits a control signal from the fourth reception device 47 to the third reception device 38 using a wireless power supply.

The third reception device 38 is a coil and receives a control signal from the fourth transmission device 48 using a wireless power supply.

The third transmission device 39 is a coil and is connected to the third reception device 38 by a wired connection The third transmission device 39 transmits a control signal from the third reception device 38 to the first reception device 29b using a wireless power supply.

The first reception device 29b is a coil and receives a control signal from the third transmission device 39 using a wireless power supply. The first control device 23 is connected to the first reception device 29b by a wired connection and receives a control signal.

In this manner, the first control device 23, the first transmission device 29a, the second reception device 36, the second transmission device 37, the fourth reception device 47, the fourth transmission device 48, the third reception device 38, the third transmission device 39, and the first reception device 29b are connected in a wireless or wired manner to form the emergency stop circuit 49.

The emergency stop circuit 49 is used by the first control device 23 of the construction machine system 1 to determine whether the first motor 32 and the second motor 42 are operable. When the emergency stop circuit 49 is in an energized state, the first control device 23 determines that first motor 32 is operable, and when the first operation button is pressed, the first motor 32 operates according to a flow described later. When the emergency stop circuit 49 is not in an energized state (i.e., when there is an interrupted part in a connection section), the first control device 23 determines that the first motor 32 is not operable, and the first motor 32 does not operate even if the first operation button is pressed. That is, when any part of the connection section of the emergency stop circuit 49 is interrupted, the first motor 32 does not operate. Similarly, when the second operation button is pressed, the second motor 42 operates. When the emergency stop circuit 49 is not in an energized state, the second motor 42 does not operate even if the second operation button is pressed. That is, when any part of the connection section of the emergency stop circuit 49 is interrupted, the second motor 42 does not operate. As a result, when any part of the connection section of the emergency stop circuit 49 is interrupted, the construction machine system 1 stops all at once.

Description of Emergency Stop Method

A method in which the drone 200 operates the emergency stop device 201 as one of emergency stop methods will be described with reference to FIGS. 8 and 9. FIG. 8 is an enlarged view of the vicinity of the emergency stop device 201 illustrating a part of the emergency stop circuit 49 and illustrating a state in which the emergency stop circuit 49 is energized. FIG. 9 is an enlarged view of the vicinity of the emergency stop device 201 illustrating a part of the emergency stop circuit 49 and illustrating a state in which the emergency stop device 201 is activated and the emergency stop circuit 49 is interrupted.

A configuration of the emergency stop device 201 will be described with reference to FIG. 8. The emergency stop device 201 includes a movable part 202, a spring part 206, and a guide part 207. The movable part 202 includes an operation part 203, an interrupting part 204, and a guide rod 205.

The operation part 203 has a plate shape extending in the X' direction and the Y' direction, and the drone 200 can land on its +Z' direction side. The operation part 203 includes the interrupting part 204 extending toward the −Z' direction side provided at one end on the +X' direction side, and the guide rod 205 and a spring part 206 extending toward the −Z' direction side provided at the other end. The guide part 207 is provided at the −Z' direction-side end of the spring part 206.

The interrupting part 204 has a rod shape extending in the −Z' direction and interrupts power and signals in a section connected by a wireless power supply.

The guide rod 205 has a rod shape extending in the Z direction, and the guide rod 205 restricts the operation of the movable part 202 to the Z' direction alone by moving along the inside of the guide part 207 described later.

The spring part 206 is provided between the +Z' direction-side end part of the guide part 207 and a bottom surface of the operation part 203 on the −Z' direction-side. The spring part 206 supports the weight of the movable part 202. The spring part 206 holds the movable part 202 at a certain position where it does not interrupt a section where the −Z' direction-side end of the guide part 207 is connected by a wireless power supply.

The guide part 207 has a block shape in which a cylindrical hole is opened. The guide part 207 restricts the moving direction of the guide rod 205.

The operation of the emergency stop device 201 will be described with reference to FIGS. 8 and 9. FIG. 8 illustrates a state in which the emergency stop circuit 49 is energized. Referring to FIG. 9, when the drone 200 lands on the operation part 203, the spring part 206 contracts due to the weight of the drone 200, and the movable part 202 starts to move toward the −Z' direction side. The guide rod 205 moves along the guide part 207, and when the spring part 206 contracts to the shortest length, the movable part 202 stops.

In the state where the movable part 202 is stopped (FIG. 9), the interrupting part 204 interrupts the wireless power supply (the wireless power supply is cut off) from the second transmission device 37 to the fourth reception device 47 and the wireless power supply from the fourth transmission device 48 to the third reception device 38. Thus, the emergency stop circuit 49 is interrupted.

When the drone 200 takes off from the operation part 203, the movable part 202 rises by the restoring force of the spring part 206, returns to the state in FIG. 8, and returns to the state in which the emergency stop circuit 49 is energized.

Note that the operation of the movable part 202 may be performed by human power. In addition, when the control device (not illustrated) of the drone 200 transmits an emergency stop signal to the first control device 23, the first control device 23 simultaneously stops the first motor 32 and the second motor 42. In some circumstances, such as when the communication state is poor, the drone 200 operates the emergency stop device 201 to simultaneously stop the first motor 32 and the second motor 42.

In the present embodiment, the operation direction of the movable part 202 is the Z' direction. However, the operation direction may be the X' direction or the Y' direction depending on the attached state.

The installation location of the emergency stop device 201 is not limited to the position of the present embodiment and may be any location as long as the location is a section connected by wireless power supply in the emergency stop circuit 49. The number of emergency stop devices 201 may be one or more.

The emergency stop circuit 49 may include a light emitter and a light receiver. In this case, a state in which light reaches the light receiver from the light emitter corresponds to a state in which a wireless power supply from the second transmission device 37 to the fourth reception device 47 is performed, for example.

In the present embodiment, a drone port for charging and standby may be provided. In the construction machine system 1 of the present embodiment, if the drone 200 is provided at a place where the position in the +Z direction is the highest and the overall visibility is good, the drone 200 can image the operation status of the construction machine system 1 as a fixed-point camera while waiting in the drone port. Further, the operation status of the construction machine system 1 may be imaged while the drone 200 is flying. By transmitting the captured image to a monitor (not illustrated), the drone 200 allows the operator of the construction machine system 1 to check the operation status of the construction machine system 1, immediately identify an abnormal location (e.g., a location where earth and sand are spilled from feeding conveyor unit 40), and take measures such as stopping. Note that a switch for starting and stopping charging may be provided in the drone port. The switch may be turned on when the drone 200 lands to start charging, and the switch may be turned off when the drone takes off. Note that a plurality of drones 200 may be provided.

In addition, the drone 200 may monitor a situation in which the five units are installed. For example, a bolt fastening state between a connection pole 35 of the rotary crusher unit and a front leg 46a of the feeding conveyor unit 40 may be imaged and transmitted to the monitor described above. This makes it possible to check the situation at a remote location when performing the fully automatic assembly mentioned above.

Furthermore, the drone 200 may include an infrared camera. As a result, the drone 200 can perform imaging even at night and can monitor the construction machine system 1 for 24 hours. The construction machine system 1 can perform unmanned operation continuously day and night.

Description of Operation/Stop Flow

FIG. 10 is a flowchart executed by the first control device 23 of the control unit 20 according to the present embodiment.

When starting this flowchart, the first control device 23 establishes communication between the first communication device 24 and the second communication device 105 of the operation display unit 100 (step S101).

The first control device 23 checks whether the emergency stop circuit 49 is energized and determines whether the first motor 32 and the second motor 42 are operable (step S102). If the emergency stop circuit 49 is not energized, the first control device 23 determines that the first motor 32 and the second motor 42 are not operable and stands by until the energization can be confirmed. If the emergency stop circuit 49 is energized, the first control device 23 determines that the first motor 32 and the second motor 42 are operable and proceeds to step S103.

The first control device 23 determines the presence or absence of the first operation signal (step S103). Here, the first operation signal is a control signal and is generated when the operator of the construction machine system 1 presses the first operation button of the operation unit 102 of the operation display unit 100 described above. The first operation signal is transmitted from the second communication device 105 to the first communication device 24 under the control of the second control device 104 and reaches the first control device 23. Note that other control signals (e.g., a first stop signal) described later also reach the first control device 23 in a similar procedure.

If the first operation signal is present, the first control device 23 proceeds to step S104. In step S104, the first control device 23 transmits the first operation signal to the first starting device 25. When receiving the first operation signal, the first starting device 25 transmits power of 200 V to the first power transmission device 26. Furthermore, the power reaches the first motor 32 via the first power reception device 31, and the first motor 32 operates.

If the first operation signal is not present, the first control device 23 proceeds to step S105. In step S105, the first control device 23 determines the presence or absence of the second operation signal.

If the second operation signal is present, the first control device 23 proceeds to step S106. In step S106, the first control device 23 transmits the second operation signal to the second starting device 27. When receiving the second operation signal, the second starting device 27 transmits power of 200 V to the second power transmission device 28. Furthermore, the power reaches the second motor 42 via the second power reception device 33, the third power transmission device 34, and the third power reception device 41. In response, the second motor 42 operates.

If the second operation signal is not present, the first control device 23 proceeds to step S107. In step S107, the first control device 23 determines the energization state of the emergency stop circuit 49.

If the emergency stop circuit 49 is energized, the first control device 23 proceeds to step S108. In step S108, the first control device 23 determines the presence or absence of the first stop signal.

If the first stop signal is present, the first control device 23 proceeds to step S109. In step S109, the first control device 23 transmits the first stop signal to the first starting device 25. When receiving the first stop signal, the first starting device 25 interrupts the power transmitted to the first power transmission device 26. As a result, the power received by the first motor 32 via the first power reception device 31 is interrupted, and the first motor 32 is stopped.

If the first stop signal is not present, the first control device 23 proceeds to step S110. In step S110, the first control device 23 determines the presence or absence of the second stop signal.

If the second stop signal is present, the first control device 23 proceeds to step S111. In step S111, the first control device 23 transmits the second stop signal to the second starting device 27. When receiving the second stop signal, the second starting device 27 interrupts the power transmitted to the second power transmission device 28. As a result, the power received by the second motor 42 via the second power reception device 33, the third power transmission device 34, and the third power reception device 41 is interrupted, the second motor 42 is stopped, and this flowchart ends.

If the second stop signal is not present, the first control device 23 returns to step S103 and repeats the control.

Returning to step S107, if the emergency stop circuit 49 is not energized, the first control device 23 proceeds to step S112. In step S112, the first control device 23 transmits the first stop signal to the first starting device 25. When receiving the first stop signal, the first starting device 25 interrupts the power transmitted to the first power transmission device 26. As a result, the power received by the first motor 32 via the first power reception device 31 is interrupted, and the first motor 32 is stopped.

Upon completion of step S112, the processing proceeds to step S113. In step S113, the first control device 23 transmits the second stop signal to the second starting device 27. When receiving the second stop signal, the second starting device 27 interrupts the power transmitted to the second power transmission device 28. As a result, the power received by the second motor 42 via the second power reception device 33, the third power transmission device 34, and the third power reception device 41 is interrupted, the second motor 42 is stopped, and this flowchart ends.

As described above, in the second embodiment, the drone 200 monitors the operation status of the five units and sends information to the first control device 23, and the drone 200 performs a stop operation of the first motor 32 and the second motor 42. That is, because the first control device 23 and the drone 200 perform cooperative control, a safe and user-friendly construction machine system can be implemented.

Third Embodiment

In a third embodiment, a U groove 313 of a pair of holding members 311A and 311B included in a rotary crusher unit 30 described later and a front leg 307 included in a feeding conveyor unit 40 described later are engaged at two positions. As a result, the rotary crusher unit 30 and the feeding conveyor unit 40 are coupled to each other, the positional relationship between the rotary crusher unit 30 and the feeding conveyor unit 40 is less likely to be shifted, and fixing to the ground or the iron plate is not required. In this way, installation time of a construction machine system 1 of the present embodiment can be shortened. Because the positional relationship is less likely to be shifted, the separation distance of the section connected by wireless power supply can also be kept at a constant interval, and a user-friendly construction machine system can be implemented.

Figure 11:
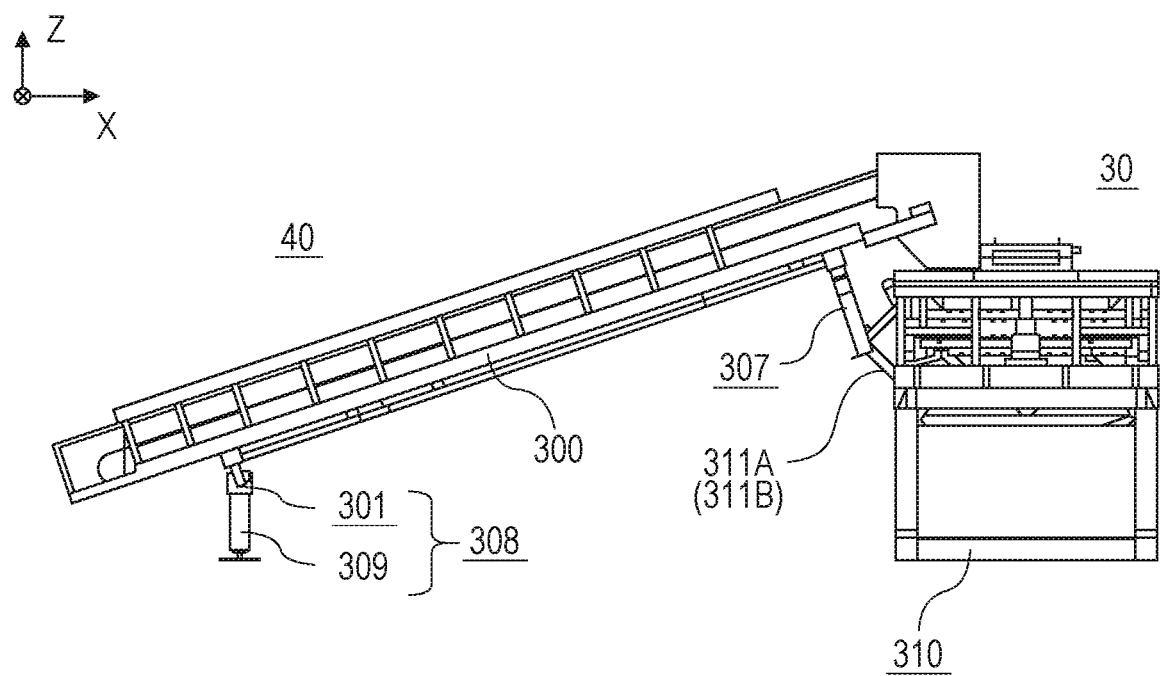
FIG. 11 is a side view illustrating a state in which a rotary crusher unit and a feeding conveyor unit of a construction machine system of a third embodiment are viewed from a −Y direction side.
Figure 12:
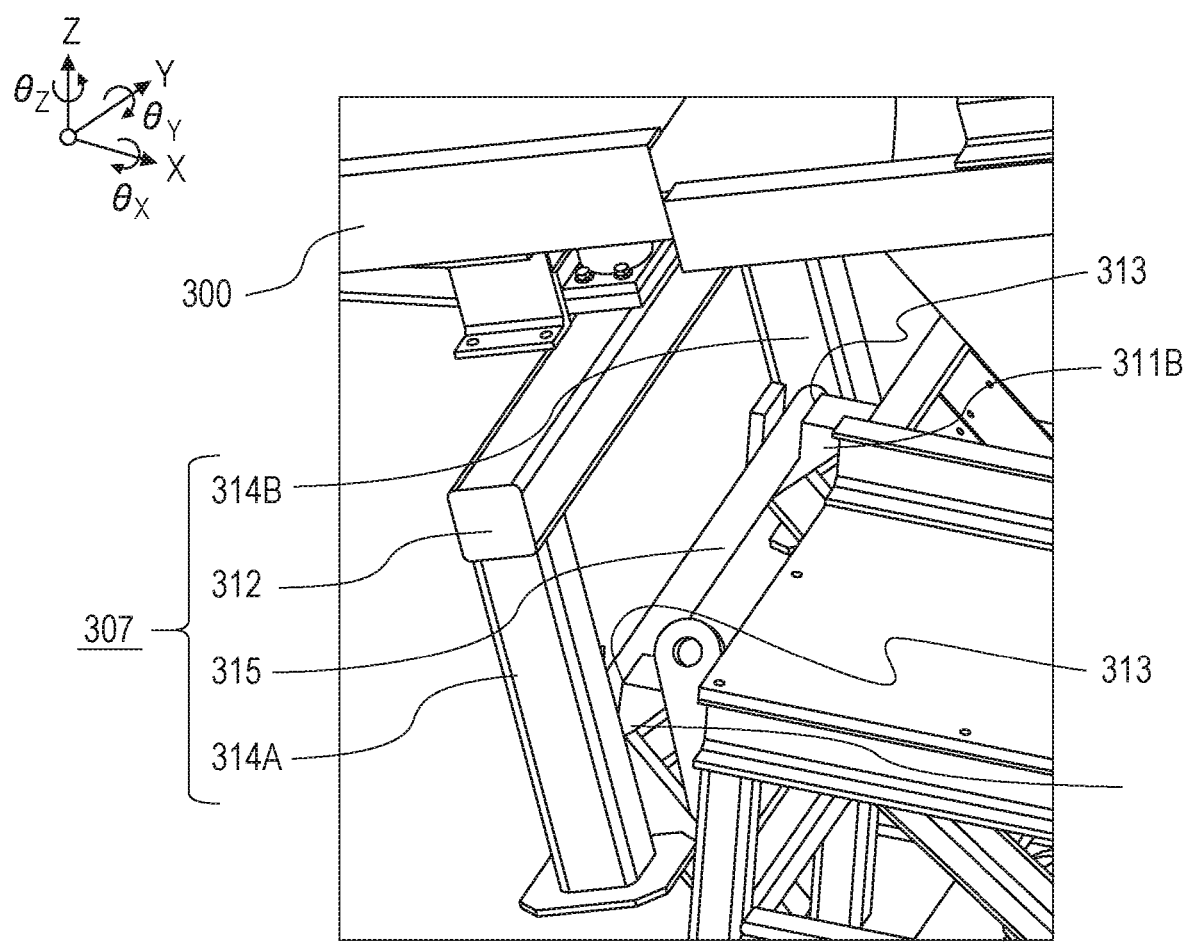
FIG. 12 is an enlarged perspective view illustrating the vicinity of a front leg of the feeding conveyor unit of the construction machine system of the third embodiment.
Figure 13:
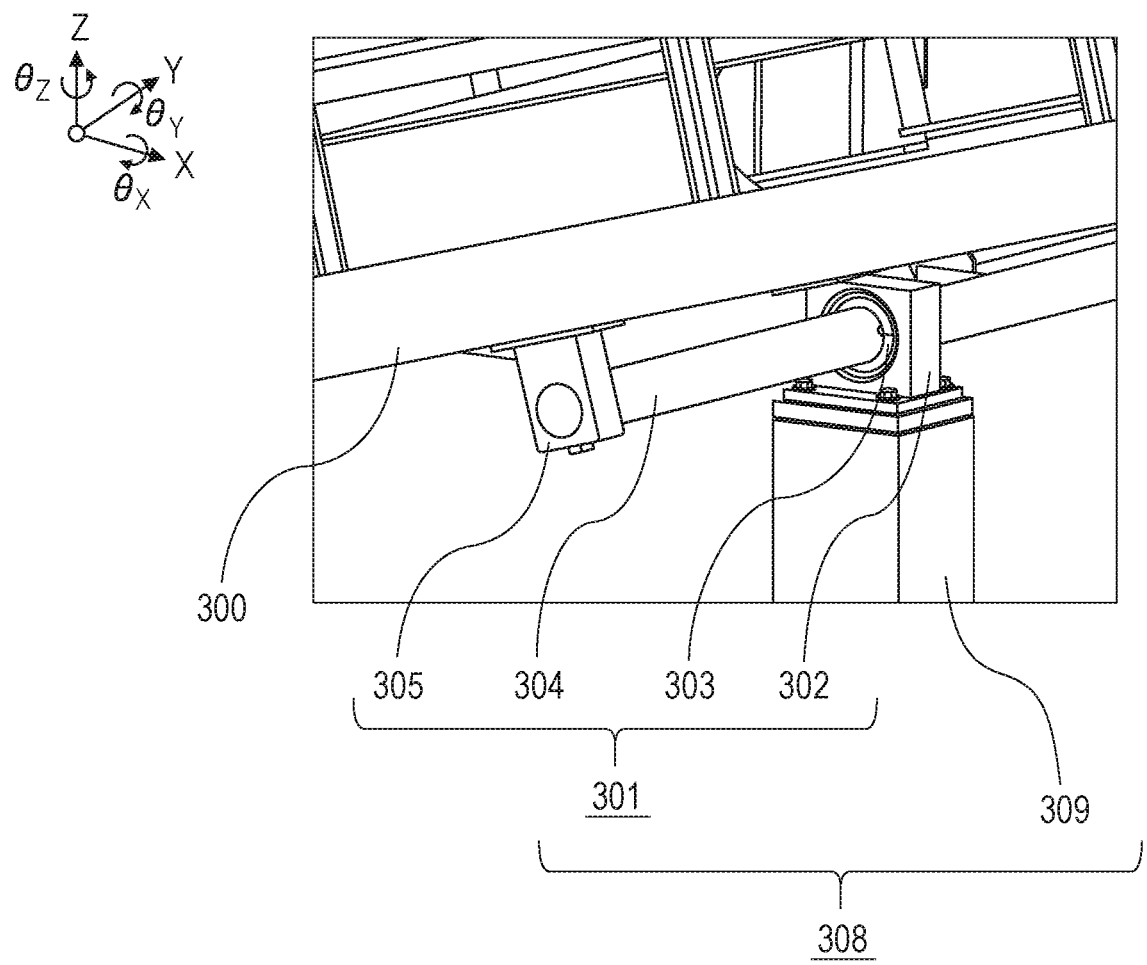
FIG. 13 is an enlarged perspective view illustrating a spherical bearing mechanism of the feeding conveyor unit of the construction machine system of the third embodiment.

The present embodiment will be described with reference to FIGS. 11 to 13. Note that the same configurations as those of the first embodiment are denoted by the same reference numerals, and the description thereof will be omitted or simplified. FIG. 11 is a diagram illustrating a state in which the rotary crusher unit 30 and the feeding conveyor unit 40 of the construction machine system 1 of the present embodiment are viewed from the −Y direction side. FIG. 12 is an enlarged perspective view illustrating the vicinity of the front leg 307 of the feeding conveyor unit 40 of the construction machine system 1 of the present embodiment. FIG. 13 is an enlarged perspective view illustrating a spherical bearing mechanism 301 of the feeding conveyor unit 40 of the construction machine system 1 of the present embodiment. For convenience of description, a vertical direction is defined as a Z-axis direction, and two axis directions orthogonal to each other in a horizontal plane are defined as an X-axis direction and a Y-axis direction in FIGS. 11 to 13. The rotation directions about the axes are defined as θX, θY, and θZ.

As illustrated in FIG. 11, the feeding conveyor unit 40 is coupled to the rotary crusher unit 30 in the vicinity of its +X direction-side end. That is, in the present embodiment, the rotary crusher unit 30 corresponds to the first unit, and the feeding conveyor unit corresponds to the second unit.

The rotary crusher unit 30 includes a frame 310.

The frame 310 serves as a base on which the rotary crusher unit 30 is in contact with an installation surface 50. The frame 310 includes the pair of holding members 311A and 311B to which the feeding conveyor unit 40 is coupled. Details of the holding members 311A and 311B will be described later.

The feeding conveyor unit 40 includes the front leg 307 and a tail frame 308.

The front leg 307 is provided in the vicinity of the +X direction-side end of a bottom surface of a conveyor main body 300.

FIG. 12 is an enlarged view of the vicinity of the front leg 307. As illustrated in FIG. 12, the front leg 307 includes a first member 312 extending in the Y direction and a pair of leg parts 314A and 314B provided at both ends of the first member 312 in the Y direction. A cylindrical member 315 as a shaft member is provided so as to connect the leg parts 314A and 314B.

The frame 310 of the rotary crusher unit 30 is provided with the pair of holding members 311A and 311B, and the cylindrical member 315 is engaged at two positions in the U grooves 313 of the holding members 311A and 311B, whereby the front legs 307 are coupled to the frame 310 (rotary crusher unit 30). Because the cylindrical member 315 is engaged with the U groove 313, the front leg 307 has a degree of freedom in a rotation direction (θy) about the Y axis with respect to the frame 310. That is, in the present embodiment, the front leg 307 corresponds to a first part of the feeding conveyor unit 40 that is the second unit, the U groove 313 corresponds to a first engagement portion or part, and the cylindrical member 315 corresponds to a second engagement portion or part.

Returning to FIG. 11, the tail frame 308 includes a leg part 309 and the spherical bearing mechanism 301 provided on the +Z direction side of the leg part 309.

The spherical bearing mechanism 301 is provided in the vicinity of the −X direction-side end of the bottom surface of the conveyor main body 300. FIG. 13 is an enlarged perspective view illustrating the spherical bearing mechanism 301. As illustrated in FIG. 13, the spherical bearing mechanism 301 includes a housing 302, a spherical bearing member 303 provided in the housing 302, a cylindrical member 304 penetrating the spherical bearing member 303, and a fixing member 305 connecting the cylindrical member 304 and the conveyor main body 300.

The housing 302 is fixed to the leg part 309 with a bolt or the like. The housing 302 has a spherical internal space capable of accommodating the spherical bearing member 303.

The spherical bearing member 303 is a substantially ball-shaped member. A through hole extending in the Y-axis direction is formed in the spherical bearing member 303, and the cylindrical member 304 penetrates the through hole. The spherical bearing member 303 can freely rotate with respect to the housing 302 as long as the cylindrical member 304 and the housing 302 do not mechanically interfere with each other. That is, the spherical bearing member 303 can rotate with respect to the housing 302 in a rotation direction about the X axis, a rotation direction about the Y axis, and a rotation direction about the Z axis.

The fixing members 305 are provided at both ends of the cylindrical member 304, and the cylindrical member 304 is fixed to the bottom surface of the conveyor main body 300 via the fixing members 305.

The spherical bearing mechanism 301 is provided between the leg part 309 and the bottom surface of the conveyor main body 300. That is, the spherical bearing mechanism 301 has the upper surface of the leg part 309 as an installation surface thereof and is in contact with the installation surface. Therefore, in the present embodiment, the spherical bearing mechanism 301 corresponds to a second part of the feeding conveyor unit 40 that is the second unit. The spherical bearing mechanism 301 allows an attitude change of the conveyor main body 300 with respect to the leg part 309 in the rotation direction about the X axis (θX), an attitude change of the conveyor main body 300 in the rotation direction about the Y axis (θY), and an attitude change of the conveyor main body 300 in the rotation direction about the Z axis (θZ).

In the present embodiment, in a state where the rotary crusher unit 30 is installed at the construction site, the feeding conveyor unit 40 suspended by a crane or the like is installed at the position of FIG. 11 from above. Then, the cylindrical member 315 of the front leg 307 of the feeding conveyor unit 40 is engaged with the U grooves 313 (e.g., engaged at two places) of the holding members 311A and 311B (see FIG. 12) provided on the frame 310 of the rotary crusher unit 30. In this way, the feeding conveyor unit 40 can be installed in a state of being coupled to the rotary crusher unit 30. Here, in the feeding conveyor unit 40, the front leg 307 has a degree of freedom in the θY direction with respect to the frame 310. In addition, the conveyor main body 300 has degrees of freedom in the θX, θY, and θZ directions with respect to the leg parts 309. As a result, the attitude of the conveyor main body 300 about the X axis can be determined so as to follow the attitude of the frame 310. Furthermore, even when the leg part 309 is inclined with respect to the horizontal plane, the inclination can be absorbed by the spherical bearing mechanism 301. By coupling the rotary crusher unit 30 and the feeding conveyor unit 40 in this manner, the positional relationship is less likely to be shifted, so that it is not necessary to fix the rotary crusher unit 30 to the ground or an iron plate, and the installation time of the construction machine system 1 of the present embodiment can be shortened. In addition, by providing a third power transmission device 34 in the vicinity of the front leg 307 and providing a third power reception device 41 in the vicinity of the holding member 311A or 311B, the positional relationship between the third power transmission device 34 and the third power reception device 41 is less likely to be shifted, the separation distance of the section connected by wireless power supply can be kept at a constant interval, and application to the first embodiment becomes possible. Similarly, by providing a second transmission device 37 and a third reception device 38 in the vicinity of the front leg 307 and providing a fourth reception device 47 and a fourth transmission device 48 in the vicinity of the holding member 311A or 311B, the positional relationship between the second transmission device 37 and the fourth reception device 47 and the positional relationship between the third reception device 38 and the fourth transmission device 48 are less likely to be shifted, the separation distance of the section connected by wireless power supply can be kept at a constant interval, and application to the second embodiment becomes possible.

As described above, in the third embodiment, the U grooves 313 of the pair of holding members 311A and 311B included in the rotary crusher unit 30 and the front leg 307 included in the feeding conveyor unit 40 are engaged at two positions. As a result, because the rotary crusher unit 30 and the feeding conveyor unit 40 are coupled to each other and the positional relationship thereof is less likely to be shifted, fixing to the ground or an iron plate becomes unnecessary, and the installation time of the construction machine system 1 of the present embodiment can be shortened. Furthermore, because the positional relationship is unlikely to be shifted, the separation distance of the section connected by a wireless power supply can be kept at a constant interval, and a user-friendly construction machine system can be implemented.

The embodiments described above are merely examples for describing the present invention, and various modifications can be made without departing from the gist of the present invention.

The following is a list of reference signs used in this specification and in the drawings.
1 Construction machine system
10 Power supply unit
11 Fuel tank
12 Internal combustion engine
13 Generator
14 Power transmission unit
20 Control unit
21 Power reception unit
22 Transformer
23 First control device
24 First communication device
25 First starting device
26 First power transmission device
27 Second starting device
28 Second power transmission device
29 First transmission device
29b First reception device
30 Rotary crusher unit
31 First power reception device
32 First motor
32a Shaft
32b Impact member
33 Second power reception device
34 Third power transmission device
35 Connection pole
36 Second reception device
37 Second transmission device
38 Third reception device
39 Third transmission device
40 Feeding conveyor unit
41 Third power reception device
42 Second motor
43 Head pulley
44 Tail pulley
45 Belt
46a Front leg
46b Rear leg
47 Fourth reception device
48 Fourth transmission device
49 Emergency stop circuit
50 Installation surface
100 Operation display unit
101 Power supply
102 Operation unit
103 Display unit
104 Second control device
105 Second communication device
200 Drone
201 Emergency stop device
202 Movable part
203 Operation part
204 Interrupting part
205 Guide rod
206 Spring part
207 Guide part
300 Conveyor main body
301 Spherical bearing mechanism
302 Housing
303 Spherical bearing member
304 Cylindrical member
305 Fixing member
307 Front leg
308 Tail frame
309 Leg part
310 Frame
311A Holding member
311B Holding member
312 First member
313 U groove
314A Leg part
314B Leg part
315 Cylindrical member

The invention claimed is:

1. A construction machine system, comprising:
a first unit provided on a ground or an installation surface having a first power receiving unit that receives power and a first power transmission unit that transmits the power;
a second unit provided on the ground or the installation surface having a second power receiving unit that receives power by a wireless power supply with the first power transmission unit, the second unit being connected to the first unit so as to determine a positional relationship with the first unit; and
a third unit provided on the ground or the installation surface having a second power transmission unit that transmits the power to the first power receiving unit by a wireless power supply when a separation distance from the first power receiving unit is within a predetermined distance, and the second power transmission unit transmits the power to the first power receiving unit by a wire when the separation distance with the first power receiving unit exceeds the predetermined distance.

2. The construction machine system according to claim 1, wherein the second unit includes a third power receiving unit that receives power received by the second power receiving unit via a wire.

3. The construction machine system according to claim 1, wherein the third unit is a control unit that controls the first unit and the second unit.

4. The construction machine system according to claim 1, wherein the first power transmission unit and the second power receiving unit are paired and arranged in a plurality of pairs in a vertical direction.

5. The construction machine system according to claim 1, further comprising a flyable moving body having an imaging device that captures an operating state of the first unit and the second unit, and a control device that transmits an image captured by the imaging device to a monitor.

6. The construction machine system according to claim 5, further comprising:
- a moving member that is capable of moving between a first position that does not block the first power transmission unit and the second power receiving unit, and a second position that blocks the first power transmission unit and the second power receiving unit,
- wherein when the flyable moving body lands on the moving member, the moving member moves to the second position in accordance with a weight of the flyable moving body, and the wireless power supply is cut off.

7. The construction machine system according to claim 5, wherein the control device transmits an image obtained by the imaging device capturing an assembly status of the first unit and the second unit to the monitor.

8. The construction machine system according to claim 2, wherein a length of the wire is longer than a distance between the first unit and the second power receiving unit.

9. A construction machine system comprising:
- a first unit provided on a ground or an installation surface having a first power receiving unit that receives power, a first power transmission unit that transmits the power, and a first engagement portion;
- a second unit provided on the ground or the installation surface having a second engagement portion that engages the first engagement portion and a second power receiving unit located near the first power transmission unit when the first and second engagement portions are engaged and receives power by wireless power transfer with the first power transmission unit; and
- a third unit provided on the ground or the installation surface having a second power transmission unit that transmits the power to the first power receiving unit by a wireless power supply when a separation distance from the first power receiving unit is within a predetermined distance, and transmits the power to the first power receiving unit by a wire when the separation distance with the first power receiving unit exceeds the predetermined distance.

10. The construction machine system according to claim 9, wherein the first unit includes a wired connection portion to which electrical wiring is connected by wire.

11. The construction machine system according to claim 9, further comprising a blocking member that enters between the first power transmission unit and the second power receiving unit and cuts off the wireless power supply.

12. The construction machine system according to claim 9, wherein the engagement between the first engagement portion and the second engagement portion is performed by at least a pair of groove portions and a shaft portion.

13. The construction machine system according to claim 9, wherein the second unit includes a leg portion that touches the ground or the installation surface.

14. A construction machine system, comprising:
- a first unit having a first power transmission unit that transmits power;
- a second unit having a first power receiving unit that receives said power by wireless power transfer when a separation distance from the first power transmission unit is within a predetermined distance, and a second power receiving unit that receives the power from the first power receiving unit via a wire;
- a first engagement portion provided in a vicinity of the first power transmission unit; and
- a second engagement portion provided in a vicinity of the first power receiving unit, the second engagement portion being capable of engaging the first engagement portion.

15. The construction machine system according to claim 14, wherein the engagement between the first engagement portion and the second engagement portion is performed by at least a pair of groove portions and a shaft portion.

* * * * *